March 12, 1957  H. R. EMRICK  2,784,752
MULTIPLE PURPOSE MACHINE TOOL
Filed Nov. 2, 1953  3 Sheets-Sheet 1
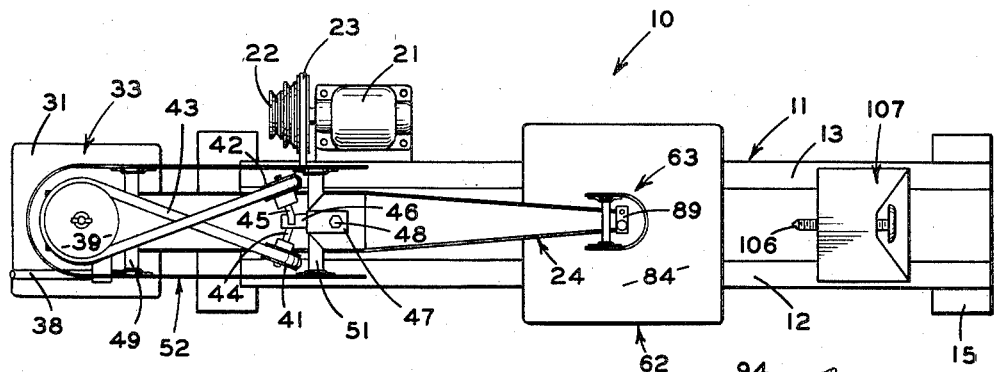
fig. 2
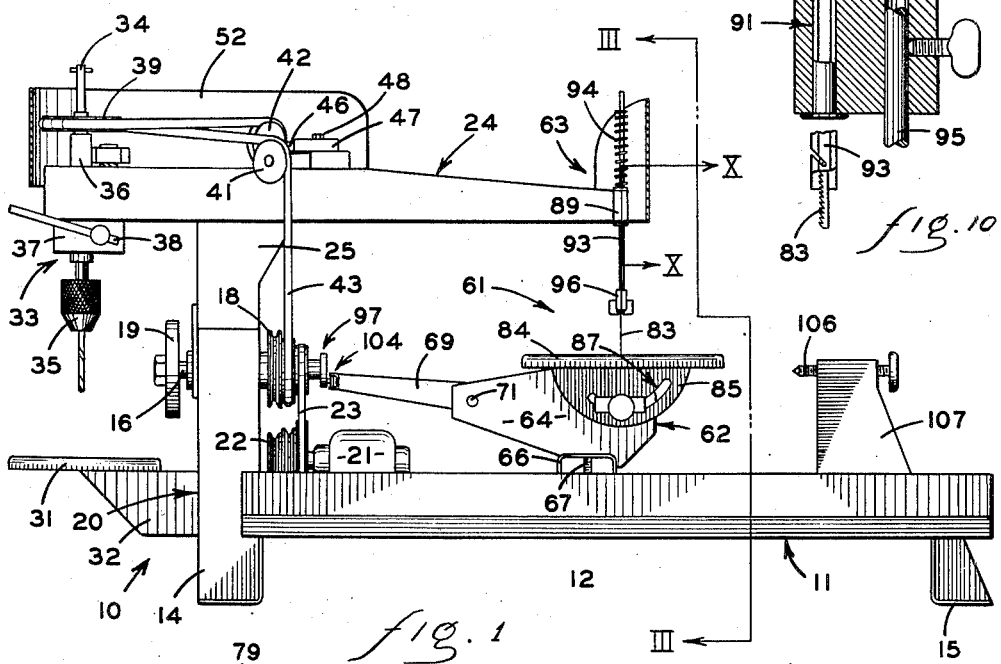
fig. 1
fig. 10
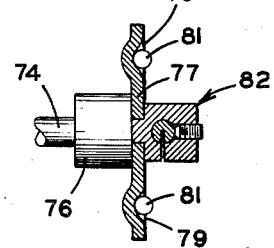
fig. 9
INVENTOR.
HOMER R. EMRICK
BY
ATTORNEY

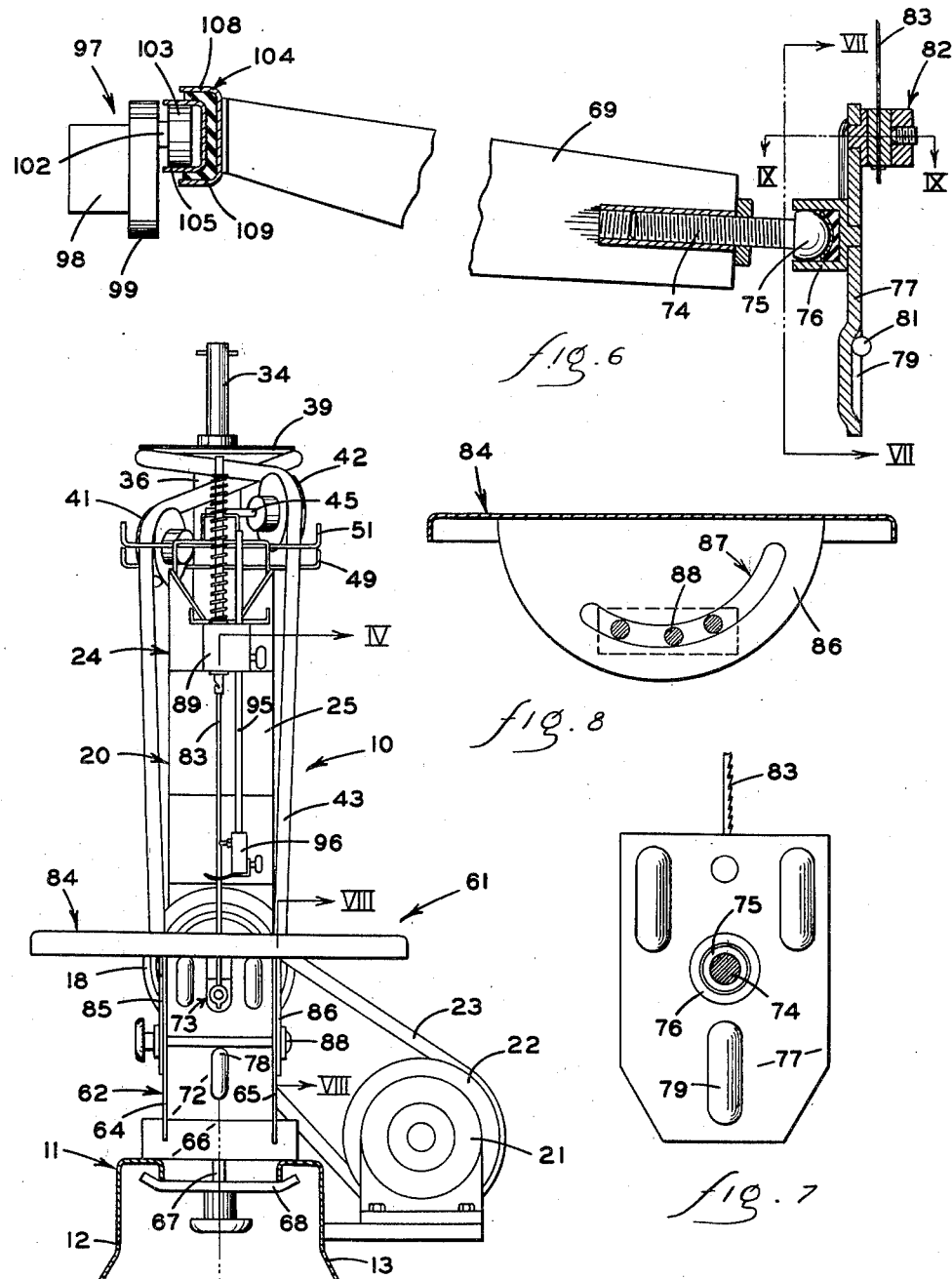

March 12, 1957     H. R. EMRICK     2,784,752
MULTIPLE PURPOSE MACHINE TOOL
Filed Nov. 2, 1953     3 Sheets-Sheet 3
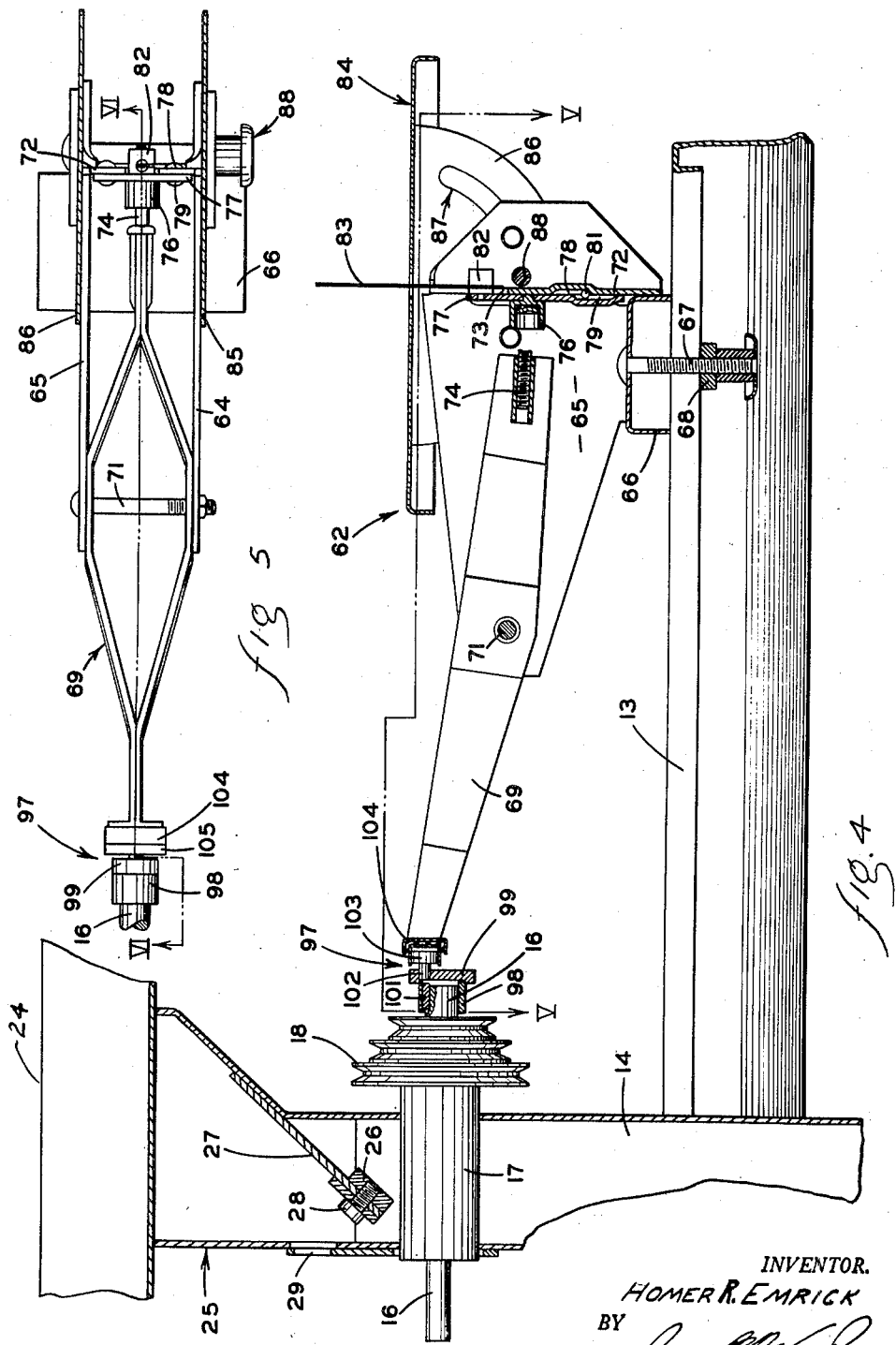
INVENTOR.
HOMER R. EMRICK
BY
ATTORNEY

United States Patent Office 2,784,752
Patented Mar. 12, 1957

2,784,752
MULTIPLE PURPOSE MACHINE TOOL

Homer R. Emrick, Kalamazoo, Mich., assignor to Emrick, Inc.

Application November 2, 1953, Serial No. 389,563

2 Claims. (Cl. 144—1)

This invention relates in general to a multiple purpose machine tool and particularly to a type having a jig-saw and in which all components are driven by a single prime mover.

Insofar as I am aware, it has been considered economically impractical, if not impossible, to combine a jig-saw with other types of power tools, such as a lathe, drill press and grinding wheel, in a single machine driven by a single prime mover. Obviously, the jig-saw must be removable with respect to the lathe bed, if mounted thereon as convenience would direct. Furthermore, the jig-saw must be actuated by means, such as the live spindle of the lathe, which is already a necessary part of the machine, to provide an uncomplicated, easily convertible structure.

Accordingly, a primary object of my invention is the provision of a multiple purpose machine tool which combines in a single machine, driven by a single prime mover, a plurality of different power tools including a jig-saw.

A further object of my invention is the provision of a machine, as aforesaid, whereby the rotational motion required to drive rotary tools, such as a drill press, lathe and grinding wheel, can be easily and efficiently converted to reciprocating motion for driving a jig-saw.

A further object of the invention is the provision of a machine, as aforesaid, wherein the jig-saw component will have the same utility and versatility generally found in a jig-saw as an independent power tool.

A further object of the invention is to provide a machine, as aforesaid, having means whereby the apparatus comprising a jig-saw component can be easily and quickly mounted upon the lathe bed and connected to the lathe live spindle.

A further object of the invention is to provide a machine, as aforesaid, which will be attractive in appearance, which will require relatively little maintenance, and which can be converted for use of its various component tools by amateur machine tool operators.

A further object of the invention is to provide a machine, as aforesaid, in which the column provided for supporting the drill press is also utilized for supporting part of the jig-saw, and the single source of power is arranged for alternatively driving the drill press or the jig-saw, as desired.

Other objects and purposes of the invention will become apparent to persons acquainted with equipment of this general type upon reading the following specification and inspecting the accompanying drawings in which:

Figure 1 is a side elevational view of my multiple purpose machine.

Figure 2 is a top plan view of my machine.

Figure 3 is a sectional view substantially as taken along the line III—III of Figure 1.

Figure 4 is a sectional view substantially as taken along the line IV—IV of Figure 3.

Figure 5 is a sectional view substantially as taken along the line V—V of Figure 4.

Figure 6 is a broken sectional view substantially as taken along the line VI—VI of Figure 5.

Figure 7 is a sectional view substantially as taken along the line VII—VII of Figure 6.

Figure 8 is a sectional view substantially as taken along the line VIII—VIII of Figure 3.

Figure 9 is a sectional view taken along the line IX—IX of Figure 6.

Figure 10 is a broken sectional view taken along the line X—X of Figure 1.

In meeting the above mentioned objects and purposes of this invention, as well as others related thereto, I have provided an elongated, horizontal lathe bed having a substantially vertical column secured at one end thereof upon which is mounted a lathe live spindle. A prime mover is supported upon said lathe bed and connected, as by pulleys, to said spindle. A boom is mounted and removably secured intermediate its ends upon the upper end of said column and said boom is disposed parallel with said lathe bed. At the end of said boom remote from said lathe bed, a drill press is supported. Said drill press is driven through pulleys and belts by said spindle. Beneath the other end of said boom, a jig-saw base member and table are removably mountable upon the said lathe bed.

A jig-saw blade is removably engaged at its upper end by means secured to said other end of said boom. The lower end of the jig-saw blade is removably engaged by means connected to one end of a lever mounted intermediate its ends upon the jig-saw base member. The other end of said lever is removably connectible to the adjacent end of the lathe live spindle.

For convenience in reference and description, the terms "upper," "lower," and derivatives thereof, as used herein, will have reference to my invention and the parts thereof as shown in Figures 1, 3 and 4. The terms "leftward," "rightward," and derivatives thereof will have reference to the machine as shown in Figures 1, 2, 3 and 4. The terms "front," "rear" and derivatives thereof will refer to the leftward and rightward sides of my machine, respectively, as appearing in Figure 3.

Description

As shown in Figures 1, 2 and 3, particularly, the basic elements of my multiple purpose machine 10 include a lathe bed 11 having a pair of horizontal, parallel ways 12 and 13, and the support section 14 of a vertical column 20 secured, intermediate its upper and lower ends, to one end of said lathe bed 11. The ways 12 and 13 are connected at their opposite ends by the foot member 15 which in conjunction with the lower end of the section 14 constitutes the means supporting the machine 10. As shown in Figures 1 and 4, a lathe live spindle 16 is rotatably supported in a bearing structure 17 of any convenient conventional type, said bearing structure 17 being supported upon and within the support section 14. Said spindle 16 is parallel with and directly above the longitudinal centerline of the bed 11. A multiple groove spindle sheave 18, having a variety of pitch diameters, is secured in any conventional manner upon the rightward end of the spindle 16, with a portion of said spindle extending rightwardly beyond said sheave. Means, such as the grinding wheel 19 (Figure 1), may be mounted upon the leftward end of the spindle 16.

A prime mover, such as the motor 21, is mounted upon a bracket of any conventional type secured to the way 13 and positioned so that a multiple groove sheave 22 mounted upon the motor shaft is adjacent to and radially aligned with the spindle sheave 18. The sheaves 18 and 22 are interconnected by a belt 23, which may be of any convenient conventional type.

The following description relates primarily to supplemental elements removably mountable upon said basic elements to provide the alternate components of my machine 10. The boom or over arm 24 is secured intermediate its ends to one end of a support post 25 (Figures 1 and 4), which post comprises, in effect, the upper section of the vertical columns 20, said post 25 being mounted upon the support section 14, thereof. In this particular embodiment the support section 14 and post 25 are substantially square in horizontal cross-section and abut each other just above the bearing structure 17 in the support section 14.

An anchor bar 26 (Figure 4) extends between the front and rear walls of the support section 14 near the upper ends thereof and is secured thereto, as by welding. Said bar 26 is disposed substantially perpendicular to the axis of the spindle 16 and is tilted at an angle of approximately 45 degrees thereto. An anchor plate 27, secured to the support post 25, overlays the anchor bar 26 and is secured thereto as by an anchor bolt 28 extending through an appropriate opening in the anchor plate 27 and threadedly engaging a tapped opening in the anchor bar 26. An access opening 29 is provided in the leftward wall of the support post 25 for removing the anchor bolt 28 when removing the boom 24. Thus, the boom 24, and support post 25 secured thereto, may be removed from the machine 10 by removing the single bolt 28.

A drill press table 31 (Figure 1) is mounted upon a table bracket 32 which in turn is secured to the support section 14 on the leftward side thereof. The table 31, being permanently secured to said column, may be considered a basic element of the machine 10. Above the drill press table 31 and upon the leftward end of the boom 24 is mounted the drill press 33 having a vertical shaft 34 with a conventional chuck 35 mounted upon the lower end thereof. The shaft 34 is rotatably supported in a bearing structure 36, of any convenient, conventional type, secured to the leftward end of said boom. A conventional elevation mechanism 37, including the handle 38 (Figures 1 and 2), is provided for raising and lowering the shaft 34 and chuck 35, supported thereon.

A drill press sheave 39 is slidably supported upon the shaft 34, as by means of a key-way and key (not shown) above the boom 24 for driving the shaft 34. A pair of pulleys 41 and 42 are mounted upon the boom 24 above the spindle sheave 18 for changing the direction of the drill press belt 43, which interconnects the sheaves 18 and 39, through an angle of approximately 90 degrees. Said drill press belt 43 is preferably circular in cross-section in order to facilitate the turning of the belt through the various directions and around the various pulleys and sheaves.

The shafts 44 and 45 (Figures 2 and 3), upon which the pulleys 41 and 42, respectively, are mounted are secured to the lower and upper surfaces, respectively, of the adjustment bar 46. Said bar 46 is releasably held in the adjustment bracket 47, mounted upon the boom 24, by means of the adjustment bolt 48, for movement toward and away from the drill press sheave 39. The bar 46, bracket 47 and bolt 48 permit adjustment of the tension upon the drill press belt 43 and facilitate disengagement of said belt when the drill press is not in operation.

As shown particularly in Figure 2, the shafts 44 and 45 are disposed at an angle to the bar 46 to permit a cross over the portion of the drill press belt 43 between the drill press sheave 49 and said pulleys 41 and 42. The shafts 44 and 45 are sloped slightly downwardly, as about five degrees, away from the adjustment bar 46 to cause the pulleys 41 and 42 to drift to the outer ends thereof.

A pair of spaced, guard brackets 49 and 51 are secured, as by welding, to the upper surface of the boom 24 for removably supporting the U-shaped guard member 52 around the drill press sheave 39 and the pulleys 41 and 42.

The details of a preferred form of the jig-saw component 61 of my machine 10 are fully disclosed in my application entitled Serial No. 389,247, filed October 30, 1953, now Patent No. 2,749,758. Therefore, only such details of said jig-saw as are necessary to support the disclosure of this application are provided herein. For further details of said jig-saw component reference is made and attention is directed to said concurrent application.

As shown in Figures 1, 2 and 3, 4 and 5, the jig-saw 61 is comprised of a base member 62 and a head member 63. The base member 62 here has a pair of spaced, parallel, vertical side plates 64 and 65 secured, as by welding, along their lower edges to a downwardly opening channel 66. Said channel 66 is slightly longer than the distance between said ways 12 and 13, and is removably secured thereto by means of the mounting bolt 67 and cross bar 68, in a conventional manner. A lever arm 69 (Figures 1, 4 and 5) is pivotally supported intermediate its ends upon a pivot shaft 71, which shaft in turn is mounted upon and between the leftward ends of the side plates 64 and 65. A vertical guide plate 72 is perpendicular to, and secured between, said plates 64 and 65 near the right ends thereof (Figures 3,4 and 5). The guide plate 72 is provided with the vertical slot 73 extending through the upper edge thereof midway between the side plates 64 and 65.

An adapter bolt 74 (Figures 6, 7 and 9) having a spherical head 75 of greater diameter than its shaft, is threadedly secured to the rightward end of the lever arm 69 and extends rightwardly therefrom substantially along the lengthwise axis thereof. The spherical head 75 is slidably, but snugly, receivable into the cylindrical adapter socket 76 secured to the leftward side of the reciprocation plate 77, which plate is parallel with and adjacent to the guide plate 72. Means, such as the vertically elongated grooves 78 and 79 in the opposing faces of the plates 72 and 77 and a ball bearing 81 between and within each such pair of opposing grooves, limit movement of the reciprocation plate 77 with respect to the guide plate 72 to vertical reciprocation. The bearings 81 space the vertical guide plate and reciprocation plate from each other and permit easy vertical movement of said reciprocation plate by the lever arm 69, operating through the adapter bolt 74 and adapter socket 76. An anchor post 82 is mounted upon the reciprocation plate 77 near the upper edge thereof and on the rightward side thereof, remote from the adapter socket 76. Said anchor post 82 extends through the slot 73 in the guide plate 72 for removably engaging the lower end of a jig-saw blade 83. A tiltable saw table 84 (Figures 5 and 8) has a pair of parallel, spaced, semi-circular rocker elements 85 and 86, secured to the lower surface thereof. Said elements 85 and 86, which embrace the remote, outside surfaces of the side plates 64 and 65, are provided with arcuate slots 87. Appropriate, aligned openings in the side plates 64 and 65, adjacent the rightward surface of the guide plate 72, are provided to receive an adjustment bolt 88 which also extends through the arcuate slots 87.

The head member 63 of the jig-saw 61 (Figures 1, 2, 3 and 7) includes a guide block 89 secured to the rightward end of the boom 24, as by welding. Said guide block 89 is provided with a pair of vertical, cylindrical openings 91 and 92 whose axes define a plane substantially perpendicular to the lengthwise extent of the boom 24. A reciprocation rod 93 is slidably, but non-rotatably, supported within the front vertical opening 91 (Figure 10) and extends above and below the guide block 89. The lower end of rod 93 is provided with means for engaging the upper end of said saw blade 83. The upper end of the rod 93 is encircled by a spiral spring 94 which resiliently resists downward movement of the rod 93 with respect to the block 89. A guide rod 95 is vertically, adjustably held within the rear vertical opening 92, and is provided at its lower end with an alignment bolt 96 for engaging and partially embracing the sawblade 83. Thus, the guide rod 95, reciprocation rod 93 and parts associated therewith, mounted upon the guide block 89 cooperate to guide and place under continuous tension the saw blade 83 when mounted upon and extending between the head member 63 and the base member 62 of the jig-saw component 61.

A conversion fixture 97 (Figures 4, 5 and 6) has a sleeve 98 and flange 99 secured to one axial end thereof. The sleeve 98 is slidably, but non-rotatably, mountable upon the rightward end of the spindle 16, which extends beyond the spindle sheave 18, by means such as the key and keyway 101. A shaft 102 eccentric to and parallel with the axis of the sleeve 98, is secured to the flange 99 and extends therefrom on the opposite side thereof from said sleeve 98. A bearing 103 is rotatably supported upon the shaft 102.

The leftward end of the lever arm 69 (Figures 4, 5 and 6) is provided with a U-shaped bracket 104. The flanges 108 and 109 of said bracket 104 are substantially horizontal and extend away from the lever 69. A channel member 105, also opening away from said lever arm 69, is resiliently supported within the U-shaped bracket 104 for loosely embracing the perimeter of the bearing 103. Thus, rotation of the spindle 16, hence the flange 99 on the fixture 97, acting through the bearing 103 effects a vertical reciprocation of the leftward end of the lever arm 69. A similar vertical reciprocation is transmitted to the rightward end of said lever arm thereby effecting a vertical reciprocation of the reciprocation plate 77.

As shown in Figures 1 and 2, a lathe dead spindle 106 is threadedly received in a horizontal position, parallel with said lathe bed 11, through an appropriate tapped opening in the spindle support 107. Said spindle support may be mounted and secured upon the ways 12 and 13 of the lathe bed 11 in the manner herein above described with respect to the jig-saw base member 62.

*Operation*

As best shown in Figures 1, 2 and 3, the basic elements of the machine 10 comprise the lathe bed 11, post member 15, the support column 14, the live spindle 16, the drill press table 41 and the motor 21. All other elements of the machine tool 10 are removably assembled upon the above basic elements by very simple operations and connections.

In assembling the drill press, for example (Figure 4) the boom or over arm 24 is mounted upon the machine 10 by placing the support post 25 upon the upper end of the support column 14. The anchor plate 27 is then fastened to the anchor bar 26 by means of the anchor bolt 28, which is inserted through the access opening 29 in the leftward side of the support post 25. The adjustment bar 46 is released in the adjustment bracket 47 by loosening the adjustment bolt 48 (Figure 1) and thereafter moving the pulleys 41 and 42 leftwardly. The drill press belt 43 is then threaded around the spindle sheave 18, the pulleys 41 and 42 and the drill press sheave 39. The adjustment bar 46 is then moved rightwardly until proper tension is placed upon the drill press belt 43, after which the bolt 48 is tightened down upon the adjustment bar 46. The drill press is now ready for operation, and starting of the motor 21 will commence the rotation of the drill press shaft 34.

The shaft 34 is raised and lowered by the drill press handle 38 operating through the elevation mechanism 37 in any conventional manner. The drill press guard member 52 may be placed upon and around the leftward end of the boom 24 by mounting same upon the guard brackets 49 and 51.

Ordinarily, if it becomes desirable to use the jig-saw component of the machine tool 10, the drill press belt 43 is disconnected from the spindle sheave 18 by reversing the above described procedure with respect to placing the drill press belt upon the various sheaves and pulleys. The conversion fixture 97 is then mounted, by means of its sleeve 98, upon the rightward end of the live spindle 16. The jig-saw base member 62 is placed upon the lathe bed 11 with the lever arm 69 extending toward the conversion fixture 97. Said base member 62 is moved toward the conversion fixture 97 until the channel member 105, at the leftward end of the lever arm 69, embraces the periphery of the bearing 103. The base member 62 is then locked down upon the lathe bed by means of the mounting bolt 67 and cross bar 68, as shown in Figure 3.

The head member 63 of the jig-saw component 61 is permanently mounted upon the rightward end of the boom 24. Thus, with the base member 62 in position, the saw blade 83 may be quickly and easily attached at its upper end to the lower end of the reciprocation rod 93, and attached at its lower end to the anchor post 82, which is accessible from the rightward end of the base member 62, as shown in Figure 3. Rotation of the spindle 16 by the motor 21 causes the bearing 103 to move in a circular path about the axis of the spindle 16. Such motion is translated by the bearing 103 and the channel member 105 into a reciprocation in a vertical plane of the leftward end of the lever arm 69. Such motion is transmitted to the rightward end of the lever arm 69 and effects a vertical reciprocation of the reciprocation plate 77, to which the anchor post 82 is secured.

As shown in Figures 1, 3 and 7, the reciprocation rod 93 is urged upwardly by the spring 94, encircling the upper end thereof. The spring is so designed that it is under a predetermined tension when the blade 83 is mounted between the lower end of the reciprocation rod 93 and the anchor post 82 on the base member 62 when the rightward end of the lever arm 69 in its uppermost position. Thus, as the spindle 16 is rotated, the rightward end of the lever arm 69, hence the reciprocation plate 77, moves downwardly and the spring 94 is placed under great tension. As the rightward end of the lever arm, upon further rotation of the spindle 16, moves upwardly, the spring 94 acting through the reciprocation rod 93 will draw the blade 83 upwardly. The blade 83 is mounted upon the anchor post 82 so that said post cannot positively drive the blade 83 upwardly. This arrangement is provided to prevent the anchor post 82 from buckling the saw blade 83 as it moves upwardly. Accordingly, the saw blade 83 is moved vertically downwardly by the lever arm 69 acting through the anchor post 82 and said blade is moved vertically upwardly by the spring 94 acting through the reciprocation rod 93.

The guide means mounted on the lower end of the guide rod 95 maintains and controls the proper vertical alignment of the saw blade 83 against pressures imposed thereon by a work piece being applied to the saw blade 83. The saw table 84 may be adjusted in a variety of positions by loosening and then tightening the table adjustment bolt 88 in a conventional manner. The table 84 has a central opening through which the blade 83 extends.

If it becomes desirable to use the lathe component of my machine 10, the jig-saw base member 62 is removed from the lathe bed 11 by reversing the procedure described above for mounting said base member upon the lathe bed 11. The boom 24 may be removed, if desired, by removing the anchor bolt 28. The conversion fixture 97 is removed from the rightward end of the spindle 16 and a conventional chuck, not shown, is mounted upon said spindle also in a conventional manner. The dead spindle support 107 is the mounted upon the lathe bed 11 in a manner described above with respect to the base member 62. A conventional tool guide, not shown, may be mounted upon the lathe bed in a conventional manner. The machine tool 10 is now ready for use as a lathe.

Accordingly, I have disclosed and described a multiple purpose machine tool comprised of a drill press component, a jig-saw component, a lathe component and a grinding component, said grinding component being produced by mounting the grinding wheel on the leftward end of the spindle 16. It can be readily observed that the basic elements of the machine tool 10 can, by adding the component elements as desired, be converted to one or more of said component power tools either individually or concurrently. Such conversion can be made easily, quickly, and in a manner requiring no special knowledge of machine tool operation or assembly.

Therefore, although the above description and accompanying drawings relate to a preferred embodiment of my invention, it will be understood that modifications thereof lying within the scope of such disclosure are fully contemplated unless specifically stated to the contrary in the appended claims.

I claim:

1. In a multiple purpose tool, including a woodworking lathe structure having a live spindle; a dead spindle; a horizontal lathe bed extending between, and spaced below, said live spindle and said dead spindle; and a vertical head stock supporting said live spindle; the improvement which includes: an extension extending vertically from said head stock; a horizontal boom secured to said extension and being vertically aligned with, and overlying, said lathe bed; a reciprocating tool depending from said boom; means connected to said live spindle for reciprocating said tool; and a table mounted on said lathe bed and having a slot therethrough for receiving said tool.

2. The combination of claim 1, wherein said lathe bed includes a pair of horizontal, parallel ways; and means, including a cross bar extending transversely of, and between, said ways for removably securing said table to said ways.

References Cited in the file of this patent

UNITED STATES PATENTS

| | | |
|---|---|---|
| 257,309 | Ford | May 2, 1882 |
| 1,999,625 | Cammack | Apr. 30, 1925 |
| 2,604,127 | Grzybowski | July 22, 1952 |

FOREIGN PATENTS

| | | |
|---|---|---|
| 334,877 | France | Jan. 5, 1904 |
| 885,607 | France | Sept. 21, 1943 |